Figure 1:
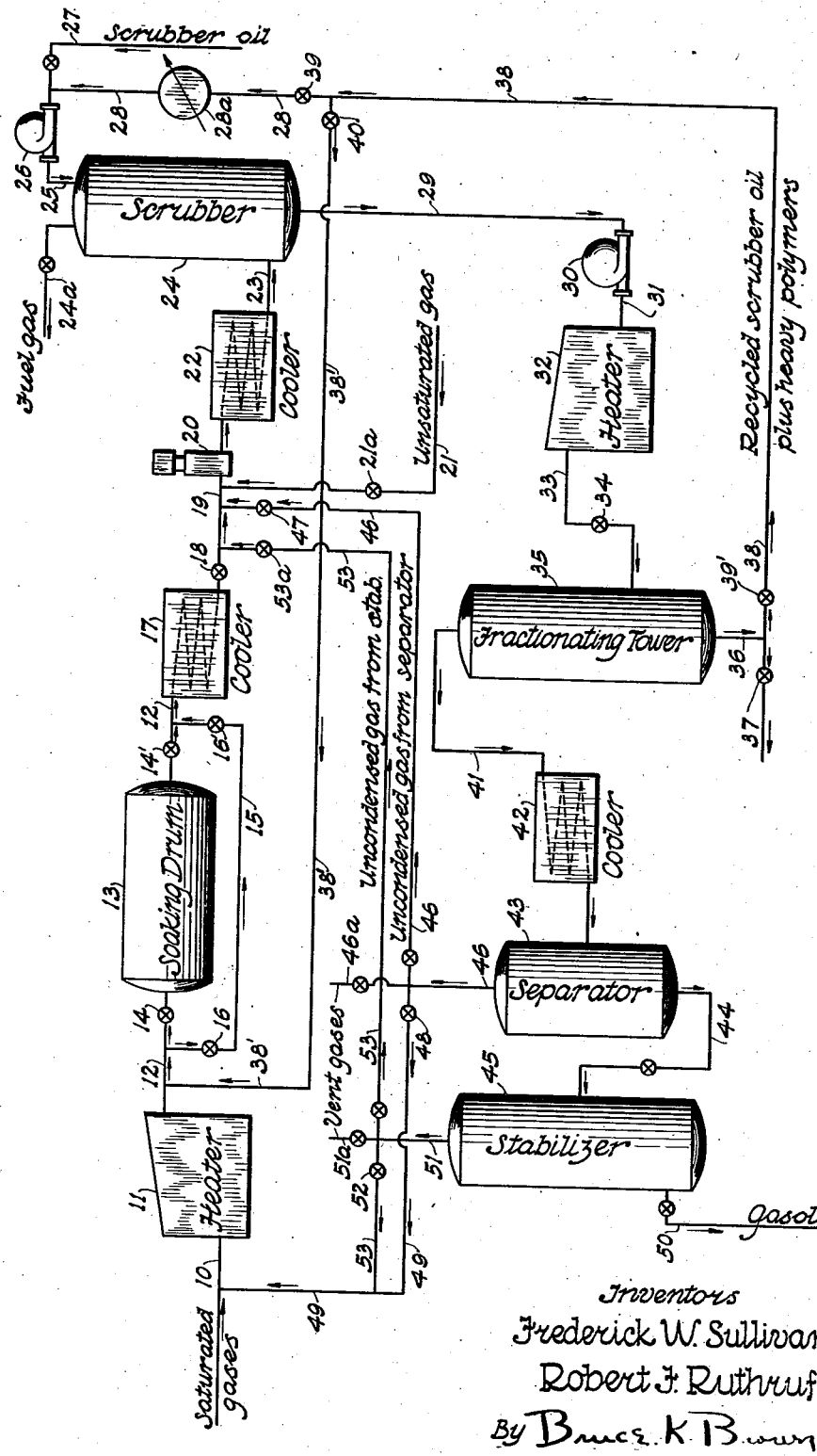

Patented May 12, 1942

2,282,549

UNITED STATES PATENT OFFICE 2,282,549

POLYMERIZATION OF HYDROCARBON GASES

Frederick W. Sullivan, Jr., and Robert F. Ruthruff, Hammond, Ind., assignors to Standard Oil Company, Chicago, Ill., a corporation of Indiana Application November 25, 1931, Serial No. 577,226

4 Claims. (Cl. 196—9)

This invention relates to improvements in the art of polymerizing gaseous olefins to light hydrocarbons of gasoline-like character with or without the use of catalysts.

The possibility of polymerizing relatively pure unsaturated gases at high pressures and elevated temperatures to yield gasoline-like hydrocarbons has been well known for many years. The impediments which have prevented commercial development of this process lie in the fact that it is impossible to produce pure olefinic gases without undue expense, and furthermore, that the compression of gases to 3000 pounds/sq. inch is an expensive procedure. If the gases containing low concentrations of olefins, such as 50% or less, are used the rate of conversion in the polymerization system is very low and considerable expense is wasted in the compression of the 50% or more of inert gases to high pressures.

In our present invention we avoid both of these difficulties. This is accomplished as follows: The olefinic gas mixture containing up to 50% or thereabouts of olefins is contacted with a suitable solvent at pressures of 100–1000 pounds/square inch under such conditions that methane, hydrogen, and to some extent the higher members of the methane series of hydrocarbons, remain undissolved and can be separated from the scrubbing oil containing dissolved olefinic hydrocarbons. This enriched scrubbing oil is then injected directly by a suitable liquid pump into the polymerization system, which operates at temperatures of 700–1000° F. and pressures of 1000–3000 pounds/square inch above atmospheric. By this means the concentration of olefins in the polymerization system is increased and the expense of compressing gases to high pressure is avoided, the injection of the scrubbing solvent charged with dissolved gases being a simple and inexpensive procedure.

It is obvious that in the above procedure the vapors of the solvent will have a slight diluent effect on the olefins in the polymerization system. If, however, a gas containing 50% ethylene be scrubbed at 500 pounds/square inch pressure with gas oil, about 50 volumes of ethylene will be dissolved per volume of liquid gas oil or per 10 volumes (approximately) subsequently formed gas oil vapor. The concentration of ethylene in the polymerization system will therefore be $100 \times 50/60$ or 83%, instead of the original 50%. This improvement is very important since in the above example of our process when 50% of the ethylene has reacted, the ratio of ethylene to original inerts will be 42/17 whereas starting with 50% olefin concentration this ratio would only be 25/50, or one-fifth as high as in our process. A great improvement in the total or net rate of polymerization is therefore obtained.

We may also utilize solvent scrubbing to eliminate methane, hydrogen, etc. as above described, from the original unsaturated gas, but, instead of injecting the solvent charged with dissolved olefins, separate the olefins from the solvent by heat and inject only the separated olefins into the polymerization system. We thus obtain a slightly higher olefin concentration in the polymerization system than in the first method, but at somewhat greater pumping expense. The choice between these process modifications will depend on various minor factors.

Any unsaturated gas mixtures, containing even as low as 30% gaseous olefins, may be used in our improved process. For example, gases from vapor phase oil cracking operations may have the composition:

| | Percent |
|---|---|
| Methane plus hydrogen | 35.4 |
| Ethylene | 22.9 |
| Ethane | 13.3 |
| Propylene | 18.1 |
| Propane | None |
| Butylenes | 5.5 |
| Butanes | 1.4 |
| Higher | 3.4 |

The total unsaturated content of this gas is only 46.5%, but if methane and hydrogen are eliminated by our improved process, the unsaturated content of the residual gas is 72.0%. We may also start with gases containing predominating amounts of ethane, propane and butane, such as are obtained from various refinery operations, and crack said gases under controlled conditions at relatively low pressures and at temperatures of 1400–1600° F. The resultant gas is particularly suitable for use in our process.

Figure 2:
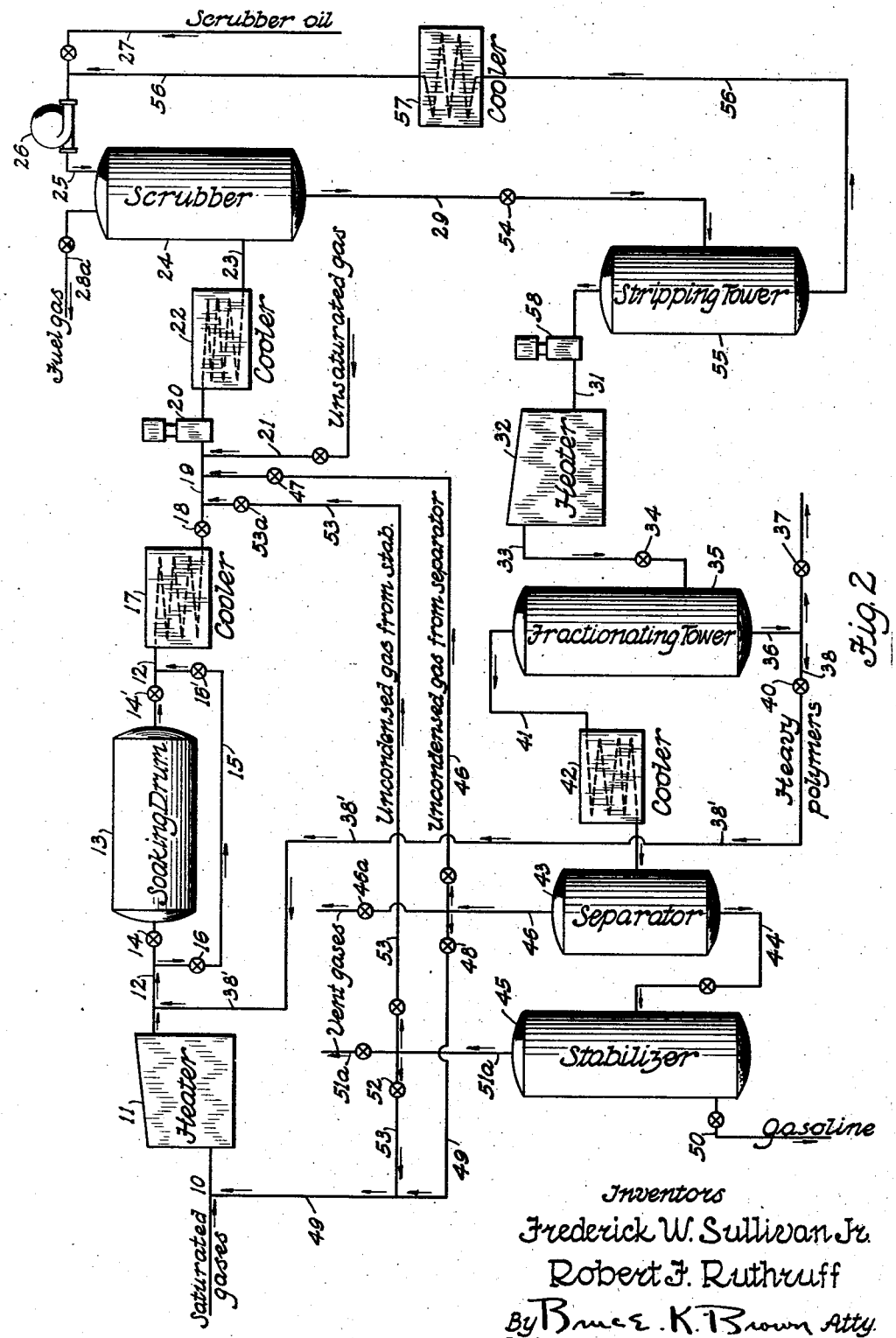

The general outline of our process will be apparent from the above description and its details will be clearly shown by the following complete description of its operation and from the drawings shown, wherein Figure 1 is a diagrammatic representation of the arrangement of apparatus when olefin solvent oil plus dissolved olefins are to be injected together into the polymerization system, while Figure 2 diagrammatically illustrates the arrangement if olefins are to be separated from the olefin solvent and injected alone.

Referring to Figure 1, when starting with saturated gases containing ethane, propane, butane, etc., they are introduced through line 10 into heater 11 where they are heated at pressures of 0–200 pounds/square inch above atmospheric to temperatures of 1400–1600° F. or thereabouts, following which they may be passed through line 12 and soaking chamber 13 to effect further conversion. Soaking chamber 13 may, however, be eliminated by closing valves 14 and 14', the gases then being passed through line 15, (by opening valves 16 and 16') directly to cooler 17. When cooled, the gases pass through valve 18 and line 19 to compressor 20. If a supply of olefin-containing gases from some outside source is available, these enter through line 21 and valve 21a, and valve 18 may be closed to eliminate that part of the system.

After compression in 20 to 100–1000 pounds per square inch, the gases are cooled in cooler 22 and passed through line 23 to scrubber 24 where they are contacted with a suitable solvent injected through line 25 by pump 26 and which is supplied with oil or solvent from line 27 or with recycled oil or solvent from line 28. Fuel gas containing primarily hydrogen and methane, but which may contain certain amounts of the higher hydrocarbon gases, and in particular the higher saturated hydrocarbon gases, is eliminated from scrubber 24 through valved off-take 24a. Solvent charged with dissolved olefinic hydrocarbon gases is removed from the scrubber 24 by line 29 and is injected by pump 30 through line 31 into the polymerization heater and reactor 32 which operates at temperatures of 700–1000° F. and 1000–3000 pounds/square inch pressure above atmospheric. The reactor 32 may consist of a closed elongated conduit in a furnace, and to obtain the necessary time of contact it may be necessary to enlarge the conduit to form what is commonly known as a "soaking drum." Suitable time, 3 to 30 minutes or thereabouts, is allowed in reactor 32 to effect conversion, and products are removed through line 33, their pressure being reduced by valve 34, after which they are passed into fractionating tower 35. From this tower liquid products higher than the gasoline boiling range are removed by off-take 36 and may be eliminated from the system through valve 37. Optionally, this heavy product may be passed through line 38 and valve 39 back to line 28 or through valve 40 and line 38' to line 12.

The solvent or oil used in scrubber 24 may be ordinary gas oil, heavy naphtha, heavy cycle stock from a cracking system, or condensed and thermally stable aromatic hydrocarbons, such as diphenyl, or polymerization products boiling higher than gasoline and produced in the system itself. The prime necessary characteristic of the solvent is that it shall, at 100–1000 pounds/square inch pressure, have a high solvent power for the gaseous olefins and a relatively low solvent power for methane and hydrogen. If an inert solvent is used it may be desirable to maintain it in liquid phase so that undue dilution of reacting gases will be avoided. Diphenyl or similar solvents may be used.

Uncondensed gases and vapors of light products are removed from fractionating tower 35 by line 41, the light products are condensed in cooler 42 and separated from uncondensed gases in separator 43. The separated light liquid products pass through line 44 to stabilizer 45 which is provided with suitable reboiling and fractionating means (not shown). Uncondensed gases are removed from separator 43 by line 46 and may be discarded through valve 46a. By opening valve 47 in line 46 and closing valve 48 in line 49 these gases may be recycled, recompressed, purified and retreated. By closing valve 47 and opening valve 48 in line 49 the gases may, on the other hand, be returned to the inlet 10 of the gas cracking heater 11 whereby their olefin content will be increased prior to returning them to the purifying and reaction system.

Returning to stabilizer 45, finished gasoline is removed through off-take 50 and uncondensed gases through off-take 51. These gases may be eliminated from the system through valve 51a or they may be passed through line 53 and valve 52 into line 49 whereby they are cracked and returned to the purification and polymerizing system. Alternatively they may be passed through valve 53a to compressor 20 for recycling.

As previously stated, under certain conditions we prefer to eliminate methane and hydrogen from the original unsaturated gas mixture by solvent scrubbing to free the residual concentrated olefin gases from the solvent and to inject them alone into the polymerization system. Figure 2 illustrates the modified arrangement of apparatus for this procedure. This need be described only insofar as it differs from the apparatus and procedure previously described in detail. Line 28, valve 39, and pump 30 (shown in Figure 1) are omitted. The solvent plus dissolved gases leaving scrubber 24 now pass through line 29 and valve 54 to stripping still 55, which is provided with suitable heating and fractionation means. From the bottom of still 55 the stripped solvent is removed through line 56, passed through cooler 57, and returned to the intake of the scrubber circulating pump 26. Concentrated olefinic gases are removed from the top of the stripping still 55 and are compressed by gas compressor 58 prior to injection through 31 into polymerization chamber 32.

All other details of this modified procedure are the same as before, except that any heavy polymerization products from the bottom of tower 35 are either eliminated or recracked, but are not continuously recycled to the scrubber 24, although we may nevertheless use said heavy ends as scrubber oil and as make-up therefor.

It will be seen from the foregoing description of our improved process that by the various modifications described therein the maximum possible ultimate yield of desired liquid products may be obtained from a starting mixture containing olefin gases in any appreciable amounts, or from one comprising mainly saturated hydrocarbons. Furthermore, these desired results may be obtained at a minimum expense for gas compression, while due to the high concentration of olefins in the polymerization system proper the rate of polymerization is increased, the necessity of extremely high pressure is avoided and the capacity of the system is greatly increased.

Wherever in the claims hereof reference is made to "unconverted gases from the polymerization system" it is to be understood that this includes gases removed from the separator 43 and also gases from the stabilizer 45.

We have stated pressure limits of 1000–3000 pounds/square inch and temperature limits of 700–1000° F. but it should be understood that if resistant alloys are developed to withstand higher temperatures, the pressures may be somewhat lowered. For instance, if a temperature of 1200° F. could be maintained the pressure could be as low as 500 pounds/square inch. The foregoing is a full and complete description of our invention but it will be understood that we are not limited to the details described therein except as defined by the following claims.

We claim:

1. The process of obtaining polymerized low boiling liquid products of the gasoline boiling range from a gas mixture containing methane, hydrogen, and less than fifty percent of gaseous olefinic hydrocarbons which comprises compressing said mixture to pressures of 100–1000 pounds per square inch above atmospheric, contacting the compressed gas mixture with a hydrocarbon solvent medium having a relatively low solvent power for methane and non-hydrocarbon gases under the working conditions, separating methane and other undissolved gases from said solvent charged with dissolved hydrocarbon gases and removing said separated methane and other undissolved gases from the system, injecting said solvent charged with said dissolved gases into a polymerization reaction system maintained at a pressure of 500–3000 pounds per square inch above atmospheric, heating said materials in said system to a temperature about 700–1200° F. and maintaining them at said temperature to effect conversion, cooling conversion products and separately recovering gasoline, oils boiling higher than gasoline, and unconverted gases, the said solvent being characterized by substantially complete thermal stability under the operating conditions of the polymerization step.

2. The process of obtaining polymerized low boiling liquid products of the gasoline boiling range from a gas mixture containing methane, hydrogen, and less than fifty percent of gaseous olefinic hydrocarbons which comprises compressing said mixture to pressures of 100–1000 pounds per square inch above atmospheric, contacting the compressed gas mixture with a hydrocarbon solvent medium having a relatively low solvent power for methane and non-hydrocarbon gases under the working conditions, separating methane and other undissolved gases from said solvent charged with dissolved hydrocarbon gases and removing said separated methane and other undissolved gases from the system, injecting said solvent charged with said dissolved gases into a polymerization reaction system maintained at a pressure of 500–3000 pounds per square inch above atmospheric, heating said materials in said system to a temperature about 700–1200° F. and maintaining them at said temperature to effect conversion, cooling conversion products and separately recovering gasoline, oils boiling higher than gasoline, and unconverted gases, the said solvent being characterized by substantially complete thermal stability under the operating conditions of the polymerization step and by having a critical vaporization temperature substantially higher than the operating temperature of the polymerization step.

3. The process of obtaining polymerized low boiling liquid products of the gasoline boiling range from a gas mixture containing methane, hydrogen, and less than fifty percent of gaseous olefinic hydrocarbons which comprises compressing said mixture to pressures of 100–1000 pounds per square inch above atmospheric, contacting the compressed gas mixture with a poly-nuclear aromatic hydrocarbon solvent medium having a relatively low solvent power for methane and non-hydrocarbon gases under the working conditions, separating methane and other undissolved gases from said solvent charged with dissolved hydrocarbon gases and removing said separated methane and other undissolved gases from the system, injecting said solvent charged with said dissolved gases into a polymerization reaction system maintained at a pressure of 500–3000 pounds per square inch above atmospheric, heating said materials in said system to a temperature about 700–1200° F. and maintaining them at said temperature to effect conversion, cooling conversion products and separately recovering gasoline, oils boiling higher than gasoline, and unconverted gases.

4. The process of obtaining polymerized low boiling liquid products of the gasoline boiling range from a gas mixture containing methane, hydrogen, and less than fifty percent of gaseous olefinic hydrocarbons which comprises compressing said mixture to pressures of 100–1000 pounds per square inch above atmospheric, contacting the compressed gas mixture with a diphenyl solvent medium, separating methane and other undissolved gases from said solvent charged with dissolved hydrocarbon gases and removing said separated methane and other undissolved gases from the system, injecting said solvent charged with said dissolved gases into a polymerization reaction system maintained at a pressure of 500–3000 pounds per square inch above atmospheric, heating said materials in said system to a temperature about 700–1200° F. and maintaining them at said temperature to effect conversion, cooling conversion products and separately recovering gasoline, oils boiling higher than gasoline, and unconverted gases.

FREDERICK W. SULLIVAN, Jr.
ROBERT F. RUTHRUFF.